(12) United States Patent
Beringer

(10) Patent No.: US 11,912,077 B2
(45) Date of Patent: Feb. 27, 2024

(54) DEVICE FOR CONTROLLING THE PRESSURE OF A TIRE OF AN AIRCRAFT WHEEL

(71) Applicant: Beringer Aero, Tallard (FR)

(72) Inventor: Gilbert Beringer, Tallard (FR)

(73) Assignee: Beringer Aero, Tallard (FR)

( * ) Notice: Subject to any disclaimer, the term of this patent is extended or adjusted under 35 U.S.C. 154(b) by 219 days.

(21) Appl. No.: 17/498,052

(22) Filed: Oct. 11, 2021

(65) Prior Publication Data
US 2022/0111688 A1 Apr. 14, 2022

(30) Foreign Application Priority Data

Oct. 9, 2020 (FR) ...................................... 2010348

(51) Int. Cl.
*B60C 23/04* (2006.01)

(52) U.S. Cl.
CPC .... *B60C 23/04985* (2020.05); *B60C 2200/02* (2013.01)

(58) Field of Classification Search
CPC ...... G01M 10/00; G01M 9/062; G01M 1/127; G01M 17/02; G01M 17/04; G01M 5/0016; G01M 5/005; G01M 9/02; G01M 99/008; G01M 9/08; G01M 9/065; B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08; G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036;
(Continued)

(56) References Cited

U.S. PATENT DOCUMENTS 4,235,184 A * 11/1980 Schiavone ........ B60C 23/04985
340/447
4,507,956 A * 4/1985 Schlesinger ........ B60C 23/0408
152/340.1
(Continued)

OTHER PUBLICATIONS

Rapport de Recherche Préliminaire et l'Opinion Ecrite [Preliminary Search Report and Written Opinion] dated Jun. 7, 2021 From the Institut Nationale de la Propriété Industrielle de la République Française Re. Application No. FR2010348. (6 Pages).

*Primary Examiner* — Andre J Allen

(57) ABSTRACT

A device for controlling the pressure of a tire of an aircraft wheel provided with a rim. The device includes a shell defining an open-ended housing; a system for controlling the pressure of a tire; and an annular band having a tensile strength of between 400 and 1500N. The system is received in the housing of the shell, and the annular band is positioned on a bearing face of the shell opposite the open-ended housing and against transverse retaining means. The device can be positioned around the rim to press the shell against the rim and close off the open-ended housing.

10 Claims, 3 Drawing Sheets

(58) Field of Classification Search
CPC .......... G01P 5/006; G01P 5/083; G01P 5/086; G01P 5/241; G01P 7/00; G01P 5/001
USPC ................................................ 73/146–146.8
See application file for complete search history.

(56) References Cited

U.S. PATENT DOCUMENTS

| | | | |
|---|---|---|---|
| 7,034,672 B2* | 4/2006 | Dinello | ................. B29C 69/004 |
| | | | 340/447 |
| 7,104,298 B2* | 9/2006 | Starinshak | .......... B60C 23/0493 |
| | | | 343/897 |
| 9,821,614 B1 | 11/2017 | Brown | |
| 11,407,261 B2* | 8/2022 | Markert | ............ B60C 23/04985 |
| 2004/0016488 A1* | 1/2004 | Benedict | ............. B60C 23/0433 |
| | | | 156/110.1 |
| 2005/0242937 A1* | 11/2005 | Yokoi | .................... B60C 19/00 |
| | | | 340/447 |
| 2010/0238011 A1 | 9/2010 | Carr et al. | |
| 2011/0296907 A1 | 12/2011 | Luce | |
| 2016/0129738 A1 | 5/2016 | Luce | |

* cited by examiner

[Fig. 1]
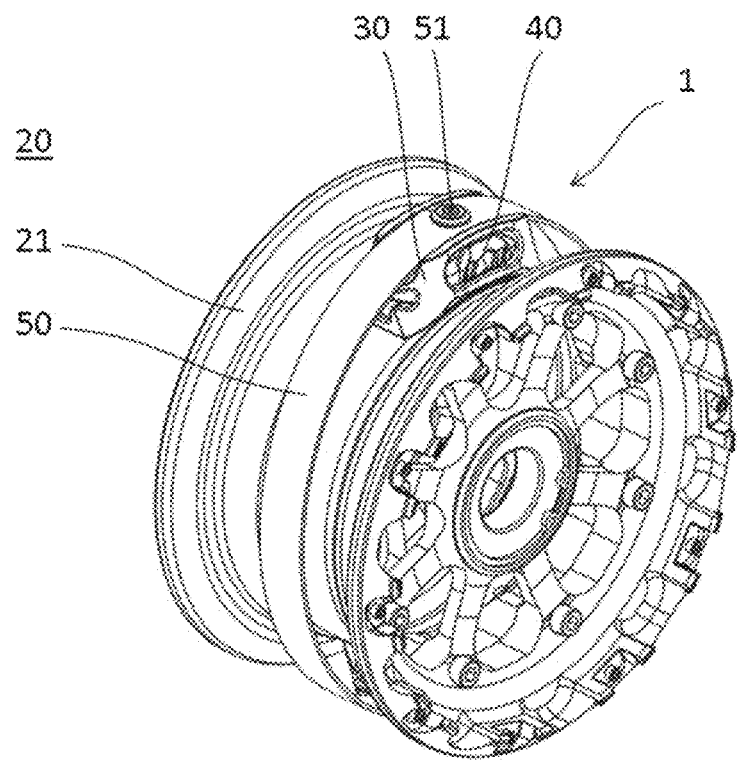
[Fig. 2]
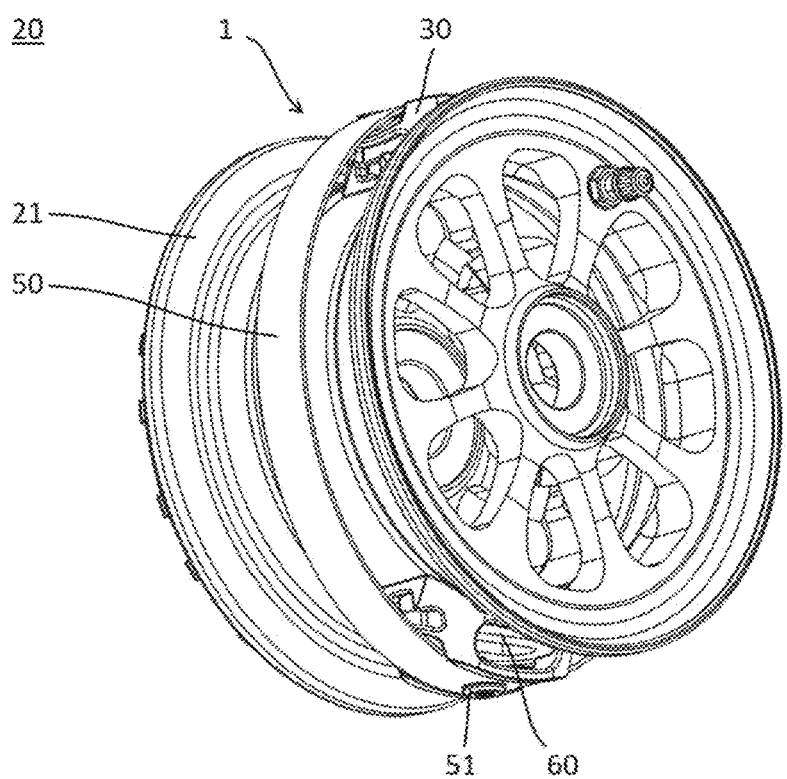

[Fig. 3]
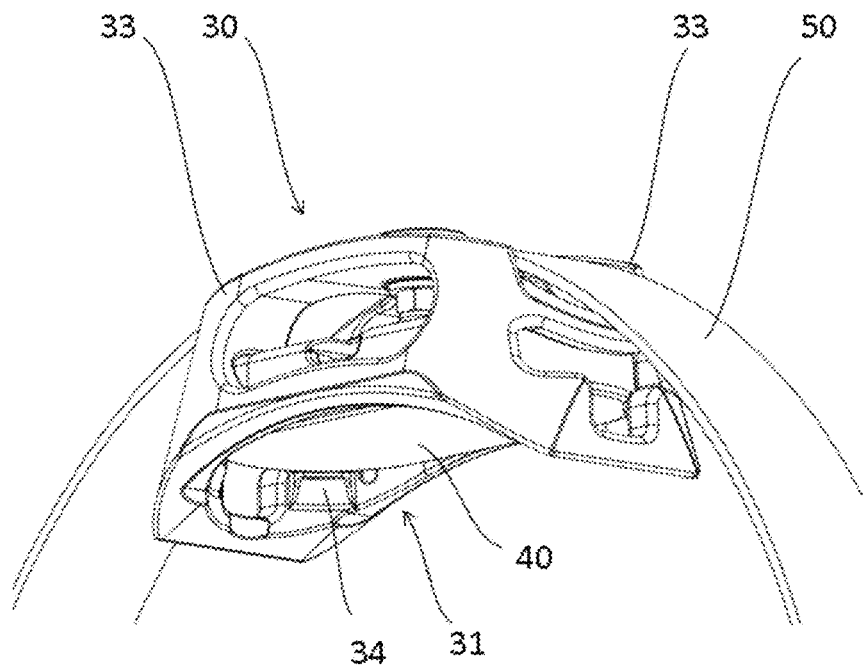
[Fig. 4]
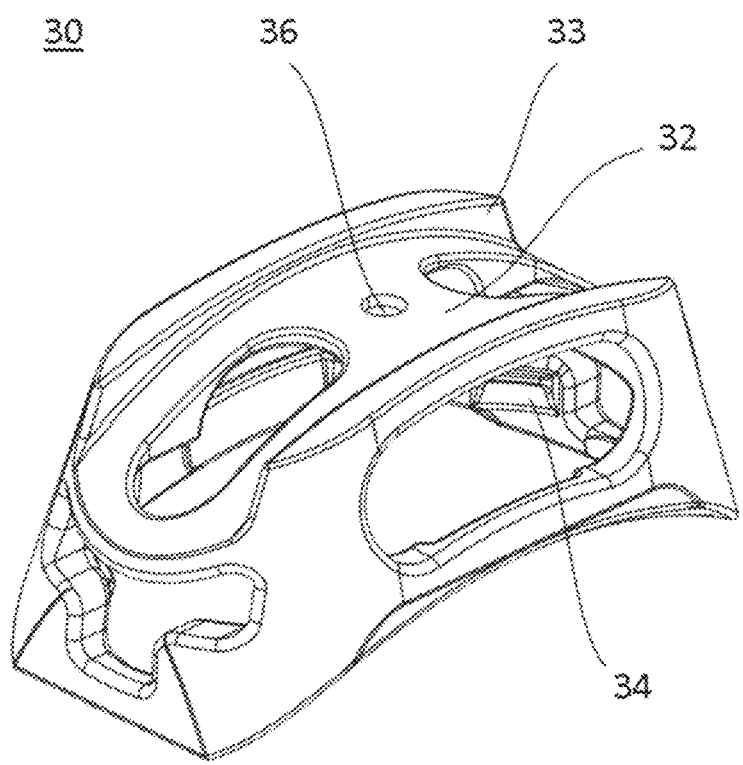

[Fig. 5]
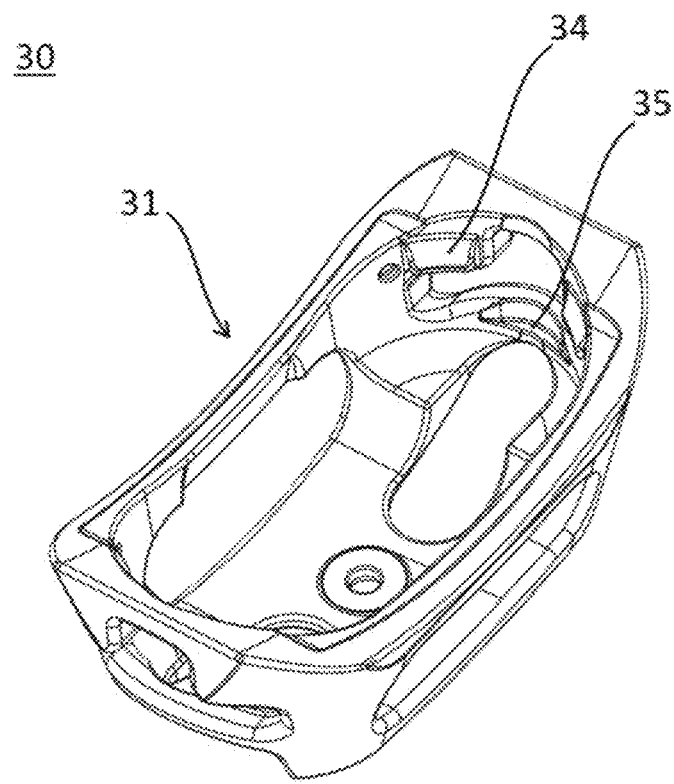
[Fig. 6]
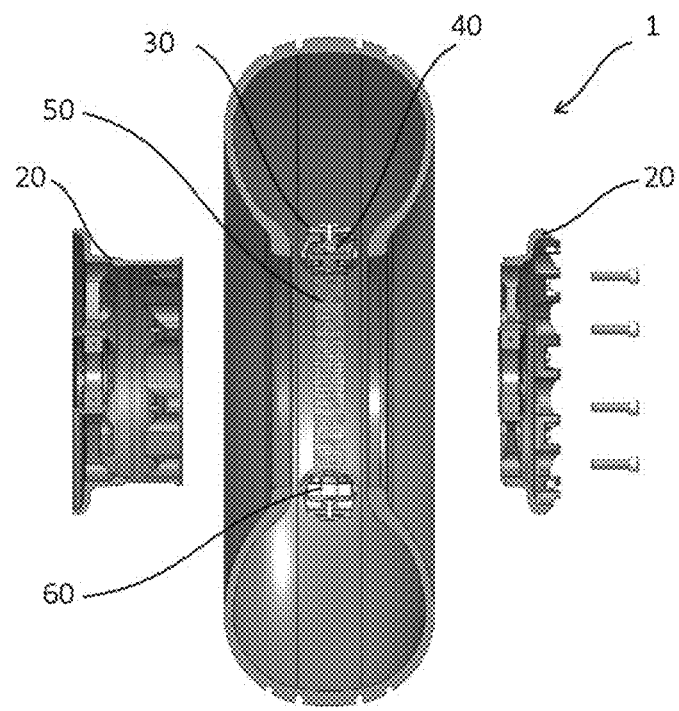

DEVICE FOR CONTROLLING THE PRESSURE OF A TIRE OF AN AIRCRAFT WHEEL

RELATED APPLICATION

This application claims the benefit of priority of France Patent Application No. 2010348 filed on Oct. 9, 2020, the contents of which are incorporated herein by reference in their entirety.

FIELD AND BACKGROUND OF THE INVENTION

The invention relates to the technical field of aircraft wheels, and in particular to the field of tire pressure monitoring systems for aircraft wheels.

In order to know and monitor the pressure inside a tire, it is known from US2010/238011, US2016/129738, U.S. Pat. No. 9,821,614 and US2011/296907 to use pressure monitoring systems commonly called "Tire Pressure Monitoring System" (TPMS), or "TPMS sensors".

Classically, these TPMS sensors are mounted directly on the tire valve. This solution can work for the automotive field, but is not adapted to the aviation field. Indeed, when an airplane lands, the wheel goes, in a fraction of a second, from a zero speed to a high speed of the order of 250 km/h for a transport airplane or of the order of 80 km/h for a light aircraft The acceleration is sufficiently high that a sensor simply mounted on the valve would be torn off by the corresponding centrifugal force. Therefore, mounting a TPMS sensor on the tire of an aircraft wheel is not possible. TPMS sensors sometimes have holes to receive screws for mounting on the rim of the wheel they are fitted to. Mounting a TPMS sensor on a rim therefore implies that a sensor will be mounted on it from the outset, because in the aviation field, wheel rims must be certified in order to guarantee their solidity and life span.

It is therefore not possible to modify existing rims and add holes or threads in order to mount TPMS sensors.

SUMMARY OF THE INVENTION

One purpose of the invention is to be able to safely mount a TPMS sensor in an aircraft wheel without making any modifications to the rim.

To this end, a device for monitoring the tire pressure of an aircraft wheel having a rim has been developed.

According to the invention, the device comprises:
a shell defining an open-ended housing;
a system for controlling the pressure of a tire; and
an annular band having a tensile strength of between 400 and 1500 N.

The pressure control system is received in the housing of the shell, and the annular band is positioned on a bearing face of the shell opposite the open-ended housing and against transverse retaining means. The device is adapted to be positioned around the rim to press the shell against the rim and close the open-ended housing.

In this manner, the pressure control system is enclosed within the shell, and the shell is held against the rim. The fit between the annular band and the rim ensures that the device is held in position. The mechanical strength of the band ensures that the pressure control system is not torn off by centrifugal force when the aircraft lands. When the rim is in two parts, the band is preferably one-piece and forms a cylindrical sleeve further improving the mechanical strength.

In a particular embodiment, the housing has snap-in means for the pressure control system. This facilitates the mounting of the system.

Preferably, the annular band is made of carbon fiber. This choice of material combines good mechanical strength with a low density.

Advantageously, the annular band has a thickness of between 0.8 and 2 mm, which makes it possible to achieve the desired mechanical resistance and mass. Its width is between 10 and 30 mm for the same reasons.

In one particular embodiment, the annular band is attached to the shell. This prevents the hull from sliding along the band when the aircraft wheel accelerates strongly.

The transverse retaining means may be of any suitable type. For example, attaching the annular band to the shell forms longitudinal retaining means, but also transverse retaining means. Preferably, the transverse retaining means are in the form of parallel sidewalls projecting from the bearing face of the shell. This ensures alignment between the shell and the belt. This also contributes to the fact that the shell does not come out from under the annular band in use. These transverse retaining means allow the shell to be guided along the annular band if the shell is moved.

Advantageously, the device includes a counterweight diametrically opposed to the tire pressure control system. This counterweight provides dynamic balancing of the device, thereby reducing vibration of the wheel as it rotates.

In this mode, the counterweight can be held by a second shell, preferably identical to the first, pressed against the rim by the annular band. The mounting of the counterweight is facilitated.

In the preferred embodiment, the annular band is one-piece and manually deformable by radial support, to be manually inserted into the tire before mounting on a two-piece rim. It is thus not necessary to use tools such as a press to mount the device in the tire. In addition, the general design of aircraft wheels does not provide enough room to attach the device to the rim and then mount the tire on the rim. This arrangement allows the device to be inserted into the tire before it is mounted in the rim, especially when the rim is in two parts.

Advantageously, the device also comprises pads arranged between the shell and the rim and/or between the band and the rim. These pads can be adapted in terms of material and/or thickness, for example so that the device does not skid on the rim when the wheel accelerates abruptly during landing, but especially to avoid scratching the rim.

BRIEF DESCRIPTION OF THE SEVERAL VIEWS OF THE DRAWINGS

FIG. 1 is a perspective view, seen from above, of a wheel equipped with a device according to the invention.

FIG. 2 is a perspective view, seen from below, of a wheel equipped with the device according to the invention.

FIG. 3 is a perspective view, seen from below, of the device according to the invention.

FIG. 4 is a perspective view of a shell included in the device according to the invention.

FIG. 5 is another perspective view of such a shell.

FIG. 6 is a cross-sectional view of a wheel equipped with a device according to the invention.

DESCRIPTION OF SPECIFIC EMBODIMENTS OF THE INVENTION

FIG. 1 illustrates a wheel (20) equipped with a device (1) according to the invention, which comprises a shell (30) receiving from below a system (40) for monitoring the pressure of the tire of the aircraft wheel (20), notably a TPMS sensor. To facilitate the reading of the figures, the tire of the wheel (20) is not shown.

The shell (30) holding the pressure control system (40) is held on the rim (21) by means of an annular band (50) that goes around the rim (21) and tightens the shell (30) against the rim (21).

By adapting the dimensions of the band (50) and thus its adjustment or tightening on the rim (21), it is thus possible to obtain a tire pressure control device (1) without modifying the rim (21). This makes it possible to mount the device (1) on any type of aircraft wheel (20) without modifying it.

The annular band (50) is advantageously made of carbon fibers, which gives the band (50) a particularly interesting mechanical strength/mass ratio.

Indeed, during a landing, the aircraft wheel (20) goes from a zero rotation speed to a high rotation speed of up to 500 rad/s, in only a fraction of a second. With such an acceleration, a sensor weighing only a few hundred grams generates a centrifugal force of more than 600 N, so the ring band (50) must be strong enough to hold it. In addition, a minimum safety factor must be taken into account, so the ring band (50) must be able to withstand a tension of 1500 N.

However, in order to save mass, this band (50) must not be too heavy. This is why other materials can be considered, such as a steel strap or cables, or a textile strap, as long as the mechanical strength/mass ratio remains satisfactory.

When the annular band (50) is made of carbon, its dimensions are generally between 0.8 mm and 2 mm thick depending on the diameter of the rim, and 5 to 40 mm wide, preferably 1.6 mm thick and 20 mm wide.

Preferably, when the rim is in two parts, the annular band (50) is a sleeve obtained by braiding carbon fibers, and then cut to the desired width of the band (50). However, it could be a band whose two ends are joined together, for example at the level of one of the shells, in the case of a one-piece aircraft rim.

The one-piece annular band (50) is preferably deformable by hand by radial support, so that the device (1) can be inserted manually into the tire before mounting on the rim (21). It is thus not necessary to use tools such as a press to mount the device (1) in the tire of the wheel (20).

When mounted, an aircraft tire has very little clearance between the rim (21) and its beads. Moreover, an aircraft tire is relatively rigid, so that mounting the tire on the rim (21) is impossible if the pressure control device (1) was screwed or held on the rim (21) beforehand: the tire would abut against the device (1) and could not be mounted on the rim (21).

FIG. 2 illustrates that a counterweight (60) can be placed opposite the pressure control system (40). This counterweight is intended to balance the device (1) so that there is no vibration when the wheel (20) rotates. A simple way to balance the device (1) is to size the counterweight (60) so that it has the same mass as the system (40), and mount the counterweight (60) in a second shell (30) identical to the first one.

Advantageously, the strip (50) is attached to the shell(s) (30) by means (51). This of course ensures that the shells (30) do not escape from the band (50) when the device (1) is in use. But it also ensures that any counterweight (60) remains diametrically opposed to the pressure control system (40), in order to maintain the dynamic balance of the device (1).

These fastening means (51) are for example a bolt clamping the band (50) against the shell (30). The means (51) may also be a screw cooperating with a threaded hole present in the shell (30), or any other suitable means chosen by the designer.

FIG. 3 illustrates the assembly of the device (1) in a preferred embodiment. It shows that the system (40) is inserted into the shell (30) via an open ended (31), and that the system (40) is held in position by snap-in means (34). These snap-in means (34) have a ramp oriented towards the opening of the open-ended housing (31) and facilitating the insertion of the system (40). The pressure control system (40) is then held between the stop faces of the snap-in means (34) and the stops (35) visible in FIG. 5.

FIG. 3 also shows that the annular band (50) is positioned in contact with the shell (30) and is guided longitudinally by transverse retaining means (33), which in this preferred embodiment are two longitudinal, parallel walls projecting from a bearing face (32) which is illustrated in FIG. 4, and against which the annular band (50) is pressed.

FIGS. 4 and 5 illustrate the shell (30) in detail. FIG. 4 shows the bearing face (32) for supporting the annular band (50). It can be seen that the bearing face (32) is curved and free of sharp corners to prevent premature wear or tearing of the annular band (50).

Also shown are the transverse retaining means (33), as well as a through hole (36) suitable for receiving the means (51) for securing the annular band (50) to the shell (30).

The transverse retaining means (33) and the fastening means (51) make it possible to ensure that the band (50) is properly held and aligned on the shell (30), so that the shell (30) does not come out from under the band (50), nor does it move along the latter, either during the mounting of the device (1) on the rim (21), or during a landing for example.

The shell (30) is made of any suitable material, such as a polymer material, for example polyurethane. This choice of material gives it the flexibility necessary for the proper operation of the snap-in means (34), and its density is low, which makes it possible to obtain a light shell (30).

For the purpose of lightness, it is also possible to provide openings in the shell (30), for example lateral openings, or upper openings at the support face (32).

The lower face of the shell (30) that is in contact with the rim (21) is curved and has the same radius as the rim (21), in order to perfectly match the rim (21).

FIG. 6 illustrates a device (1) mounted in the tire of the wheel (1), prior to the mounting of the rim (20) which is here in two parts. It can be seen in this view that the device is bulky, and that the advantage conferred by a deformable annular band (50) is obvious. If the device had to be mounted on the rim beforehand, then mounting the tire would be very difficult or even impossible, given its rigidity.

Pads not shown may be disposed between the shell (30) and the rim (21), or between the annular band (50) and the rim (21). These pads may serve to prevent the device (1) from slipping on the rim (21) when the aircraft wheel (20) accelerates abruptly during a landing. These pads can also ensure that the rim (21) is not scratched or worn by the shell(s) (30), or by the strip (50).

Furthermore, the device (1) may be shaped differently from FIGS. 1 to 5 without departing from the scope of the invention, which is defined by the claims. In particular, the shell (30) and the band (50) may be shaped differently and may be of any type suitable for the present application.

Furthermore, the technical characteristics of the various embodiments and variants mentioned above can be, in whole or in part, combined with each other. Thus, the device (1) can be adapted in terms of cost, functionality, and performance.

What is claimed is:

1. A device for controlling the pressure of a tire of an aircraft wheel provided with a rim, the device comprises:
    a shell defining an open-ended housing;
    a pressure control system for controlling the pressure of a tire; and
    an annular band having a tensile strength of between 400 and 1500 N;
    wherein the pressure control system is received in the open-ended housing of the shell;
    wherein the annular band is positioned on a bearing face of the shell opposite the open-ended housing and against parallel walls projecting from the shell;
    wherein the parallel walls configured for being positioned around the rim to press the shell against the rim and to close off the open-ended housing.

2. The device according to claim 1 wherein the open-ended housing is snapped to the pressure control system.

3. The device according to claim 1, wherein the annular band is made of carbon fibers.

4. The device according to claim 1, wherein the annular band has a thickness between 0.8 and 2 mm and a width between 10 and 30 mm.

5. The device according to claim 1, wherein the annular band is fixed to the shell.

6. The device according to claim 1, wherein the transverse retaining means are in the form of parallel side walls projecting from the bearing face of the shell.

7. The device according to claim 1, further comprising a counterweight diametrically opposed to the tire pressure control system.

8. The device according to claim 7, wherein the counterweight is held by a second shell pressed against the rim by the annular band.

9. The device according to claim 1, wherein the annular band is deformable by hand by radial support, allowing the annular band to be inserted into the tire before mounting on the rim.

10. The device according to claim 1, further comprising pads arranged between the shell and the rim and/or between the band and the rim.

* * * * *